United States Patent Office 3,794,650
Patented Feb. 26, 1974

3,794,650
α-AMINOMETHYL - 2 - QUINOLINEETHANOLS, α - AMINOMETHYL - 1 - ISOQUINOLINE-ETHANOLS, α-AMINOMETHYL - 6 - PHENAN-THRIDINEETHANOLS AND THEIR KETONIC ANALOGUES
Robert F. Meyer and Charlotte D. Stratton, Ann Arbor, Mich., assignors to Parke, Davis & Company, Detroit, Mich.
No Drawing. Filed Aug. 14, 1972, Ser. No. 280,514
Int. Cl. C07d 39/02
U.S. Cl. 260—286 A         7 Claims

ABSTRACT OF THE DISCLOSURE

α-Aminomethyl-2-quinolineethanols, α-aminomethyl-1-isoquinolineethanols, α-aminomethyl - 6 - phenanthridine-ethanols and their ketonic analogues; and acid-addition salts. The amino group is substituted by tert-butyl, isopropyl, or 3,4-dimethoxyphenethyl. The 2-quinolyl group is optionally substituted by methyl or phenyl. The compounds are pharmacological agents, especially beta-adrenergic blocking agents. The aminoalkanols can be produced by reduction of the corresponding aminoketones or by catalytic hydrogenation of an N-benzyl derivative. The aminoketones can be produced by the acidic hydrolysis of a corresponding eneamine derivative or by catalytic hydrogenation of an N-benzyl derivative. Starting materials for use in those processes are obtained by detailed procedures generally starting from a methyl-substituted heterocyclic nucleus.

SUMMARY AND DETAILED DESCRIPTION

The present invention relates to certain new heterocyclic-substituted aminoalkanols and aminoketones, to salts thereof, and to methods for the production of the foregoing compounds.

In the forms of their free bases, the compounds of the invention can be represented by the formula

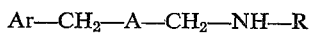

In this formula, Ar represents 2-quinolyl, 2-quinolyl substituted by a single methyl group, 3,4-dimethyl-2-quinolyl, 4-phenyl-2-quinolyl, 1-isoquinolyl, or 6-phenanthridinyl; A represents hydroxymethylene (—CHOH—), or carbonyl

and R represents isopropyl, tert-butyl, or 3,4-dimethoxyphenethyl; provided, however, that when A represents carbonyl, Ar represents 6-phenanthridinyl.

In accordance with the invention, the compounds of the invention wherein A represents hydroxymethylene (including free base and salt forms) can be produced by reacting an aminoketone compound of the formula

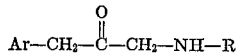

or a salt thereof with a reducing agent; where Ar and R are as defined before. Some examples of suitable reducing agents are alkali metal hydride reducing agents such as sodium borohydride and lithium aluminum hydride, and hydrogen in the presence of a catalyst such as Raney nickel or ruthenium. A preferred reducing agent is sodium borohydride. The solvents that can be used for the reaction are dependent on the particular reducing agent employed. In the case of lithium aluminum hydride, the reaction is first carried out in an anhydrous, non-hydroxylic solvent such as an ether, hydrocarbon, or mixtures thereof and the product is isolated following hydrolysis of the intermediate complex formed in the reaction, with water, dilute acid, or other aqueous or hydroxylic medium. In the case of hydrogenation in the presence of a catalyst, any of a large variety of unreactive neutral, basic, or acidic solvent media can be used. In the case of sodium borohydride, some preferred solvents are lower alkanols such as methanol, ethanol, and isopropyl alcohol; aqueous lower alkanols; ethers such as tetrahydrofuran, dioxane, and diethylene glycol dimethyl ether; and mixtures thereof. When using sodium borohydride in an aqueous or hydroxylic solvent, decomposition or hydrolysis of the intermediate complex occurs in the reaction mixture and, if necessary, hydrolysis can be completed by the addition of water or other aqueous medium. The time and temperature of the reaction are not particularly critical but depend somewhat on the particular reducing agent. In general, the reaction is carried out at a temperature between about 0 and 100° C. or the reflux temperature of the solvent for from one to 48 hours. Using the preferred reducing agent sodium borohydride, it is customary to carry out the reaction at room temperature for from 5 to 20 hours, optionally followed by heating the reaction mixture briefly to ensure completeness of the reaction. At least the calculated amount of reducing agent is used although an excess is preferred. The product is isolated as the free base or as an acid-addition salt following adjustment of the pH as necessary.

The aminoketones employed as starting materials in the foregoing process can be obtained by any of a variety of methods. Those aminoketones where Ar represents 6-phenanthridinyl are themselves compounds of this invention and can be obtained as described elsewhere herein. Those aminoketones where Ar represents some other group, can be produced by forming the lithium derivative of a compound of the formula

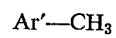

reacting it with an aminoacetonitrile of the formula

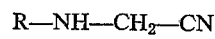

and hydrolyzing the reaction mixture with water to produce an eneamine of the formula

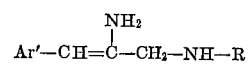

The eneamine is hydrolyzed by reaction with aqueous acid to produce an aminoketone compound employed as starting material. These procedures are illustrated in greater detail elsewhere herein. In the above formulas, Ar' represents 2-quinolyl, 2-quinolyl substituted by a single methyl group, 3,4-dimethyl-2-quinolyl, 4-phenyl-2-quinolyl, or 1-isoquinolyl; and R is as defined before.

Also in accordance with the invention, the compounds of the invention wherein A represents hydroxymethylene (including free base and salt forms) can be produced by reacting a compound of the formula

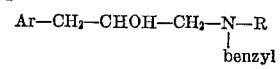

or a salt thereof with hydrogen in the presence of a catalyst. The catalyst to be used is one capable of removing the benzyl group. Examples of such catalysts are palladium and palladium oxide, optionally supported on a carrier such as charcoal. The preferred catalyst is palladium on charcoal. In the starting material, the benzyl group can be either unsubstituted or substituted by any of a variety of atoms or groups. The exact nature of the substitution is not critical since the benzyl group is removed in the course of the reaction. Some suitable solvents for the reaction are water, lower alkanols such as methanol, ethanol, or isopropyl alcohol, ethers such as dioxane or tetrahydrofuran, lower alkanoic acids such as acetic acid, or mixtures thereof. A preferred solvent is methanol. When the starting material is the free base, it is preferred to add about two equivalents of a strong acid such as hydrochloric acid to the reaction mixture. The hydrogen pressure is not critical and can be varied from atmospheric pressure to several hundred pounds per square inch or more. A preferred hydrogen pressure is about 40 to 60 pounds per square inch. Similarly, the time and temperature of the reaction are not critical and it is customary to carry out the hydrogenation reaction at room temperature until the calculated amount of hydrogen has been absorbed. In the case of an unsubstituted benzyl group, the calculated amount is one molecular equivalent of hydrogen. The product is isolated as the free base or as an acid-addition salt following adjustment of the pH as necessary.

Starting materials required for use in the foregoing process can be prepared by any of a variety of methods. For example, a compound of the formula

Ar-CH₃ is converted to the lithium derivative and reacted with a benzylamino acetonitrile compound of the formula

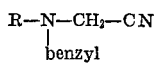
R—N—CH₂—CN
    |
  benzyl followed by hydrolysis of the reaction mixture with water to produce an eneamine of the formula

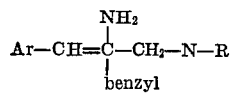
      NH₂
       |
Ar—CH=C—CH₂—N—R
              |
             benzyl and hydrolysis of the eneamine with aqueous acid to produce a ketone of the formula

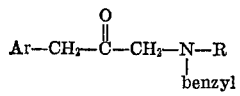
       O
       ‖
Ar—CH₂—C—CH₂—N—R
               |
              benzyl The latter is reduced with sodium borohydride to produce a compound used as starting material in the above process. These steps are illustrated in greater detail hereinafter. In the above formulas Ar and R are as defined before.

Further in accordance with the invention, the ketones of the invention, that is the compounds wherein A represents carbonyl and Ar represents 6-phenanthridinyl (including free base and salt forms) can be produced by reacting a compound of the formula

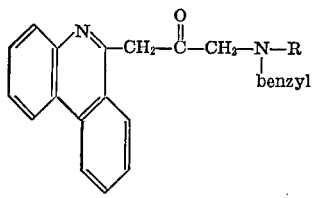

or a salt thereof with hydrogen in the presence of a catalyst. The catalyst to be used is one capable of removing the benzyl group while leaving the carbonyl group substantially unreacted. Examples of such catalyst are palladium and palladium oxide, optionally supported on a carrier such as charcoal. The preferred catalyst is palladium on charcoal. In the starting material, the benzyl group can be either unsubstituted or substituted by any of a variety of atoms or groups. The exact nature of the substitution is not critical since the benzyl group is removed in the course of the reaction. Some suitable solvents for the reaction are water, lower alkanols such as methanol, ethanol, or isopropyl alcohol, ethers such as dioxane or tetrahydrofuran, lower alkanoic acids such as acetic acid, or mixtures thereof. A preferred solvent is methanol. When the starting material is the free base, it is preferred to add about two equivalents of a strong acid such as hydrochloric acid to the reaction mixture. The hydrogen pressure is not critical and can be varied from atmospheric pressure to several hundred pounds per square inch or more. A preferred hydrogen pressure is about 40 to 60 pounds per square inch. Similarly, the time and temperature of the reaction are not critical and it is customary to carry out the hydrogenation reaction at room temperature until the calculated amount of hydrogen has been absorbed. In the case of an unsubstituted benzyl group, the calculated amount is one molecular equivalent of hydrogen. The product is isolated as the free base or as an acid-addition salt following adjustment of the pH as necessary.

Starting materials to be used in the foregoing process can be produced in any of number of ways, for example as described for starting materials to be used in the preceding process of the invention.

Still further in accordance with the invention, the ketones of the invention, that is the compounds wherein A represents carbonyl and Ar represents 6-phenanthridinyl (including free base and salt forms) can be produced by reacting an eneamine of the formula

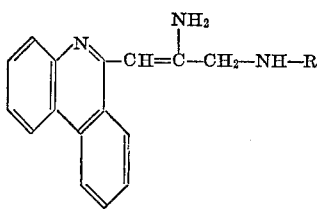

or a salt thereof with water in the presence of a strong acid; where R is as defined before. At least the calculated amount of water is used; however, the preferred solvent is water or an aqueous lower alkanol and, therefore, water is usually present in a very large excess. Some examples of suitable strong acids are mineral acids such as hydrochloric, sulfuric, or phosphoric acid, or strong organic acids such as p-toluenesulfonic acid. If the eneamine starting material is used in the form of an acid-addition salt with a strong acid, an additional quantity of strong acid is not necessary. The hydrolysis reaction proceeds under mild conditions and, therefore, the time and temperature of the reaction are not critical. The reaction can be carried out at about 0–100° C. for from a few minutes to 24 hours. Preferred conditions are to warm the mixture at 50–80° C. for from 5 to 30 minutes. The product is isolated directly as an acid-addition salt or, following treatment with a base, as the free base; further conversion to any other desired acid-addition salt can also be carried out.

The starting materials required for use in the foregoing process can be prepared by any of a number of methods as illustrated elsewhere herein. For example, 6-methylphenanthridine is converted to the lithium derivative and reacted with an aminoacetonitrile of the formula

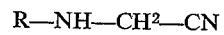
R—NH—CH²—CN

The desired eneamine is obtained after diluting the reaction mixture with water.

The free bases of the invention form acid-addition salts with any of a variety of organic and inorganic acids. Pharmaceutically-acceptable acid-addition salts are formed with such acids as hydrochloric, hydrobromic, sulfuric, nitric, phosphoric, acetic, citric, tartaric, succinic, salicylic, maleic, malic, lacic, gluconic, and pamoic acids. Typically the free bases of the invention form salts with two equivalents of acid, or with fewer than two equivalents of acid if the amount of acid is restricted. The free bases and their salt forms are interconvertible by adjustment of the pH. The free bases are produced by basification and the acid-addition salts are produced by acidification. They differ in solubility properties but, in general, are otherwise equivalent for the purposes of the invention. Those compounds of the invention wherein A represents hydroxymethylene also exist in d- and l- as well as in racemic forms.

The compounds of the invention can exist in anhydrous form as well as in solvated, including hydrated, forms. In general, the hydrated forms and the solvated forms with pharmaceutically-acceptable solvents are equivalent to the anhydrous or unsolvated form for the purposes of the invention.

The compounds of the invention are new chemical compounds of value as pharmacological agents and especially as beta-adrenergic blocking agents. Beta-adrenergic blocking agents are useful in the treatment of angina pectoris and various types of cardiac arrhythmias such as atrial fibrillation and tachycardia. Beta-adrenergic blocking effects can be measured by the ability to block or antagonize the action of isoproterenol, an adrenergic agent, in various tissues. The compounds of the invention were evaluated by following the procedures of Bristow et al., Journal of Pharmacology and Experimental Therapeutics, 171, 52–61 (1970), but using as test tissue albino guinea pig atrium. Some results obtained in representative cases are as follows. α-[(Tert-butylamino)methyl] - 2 - quinolineethanol, $K_B$ (atrium)=$4.0 \times 10^{-7}$. α - [(Tert - butylamino)methyl]-4-methyl - 2 - quinolineethanol $K_B$ (atrium)=$7.6 \times 10^{-8}$. α-[(Tert-butylamino)methyl] - 6-phenanthridineethanol (tested as monooxalate salt), $K_B$ (atrium)=$1.4 \times 10^{-9}$. The compounds of the invention are active upon oral or parenteral administration. By reason of high beta-adrenergic blocking activity, the preferred compounds are those wherein Ar represents 6-phenanthridinyl of the formula

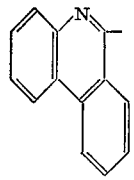

The invention is illustrated by the following examples.

EXAMPLE 1

With stirring at 0–5° C., 10 g. of sodium borohydride is slowly added to a solution of 17.5 g. of 1-(tert-butylamino)-3-(2-quinolyl) - 2 - propanone dihydrochloride in 750 ml. of ethanol. The solution is stirred at room temperature for 5 hours, heated to reflux, treated with 100 ml. of water, and evaporated under reduced pressure. The residue is extracted with ether and the ether solution is washed with water, dried, and evaporated to give α-[(tert-butylamino)methyl]-2-quinolineethanol; M.P. 83–84° C. after crystallization from hexane. This product is dissolved in isopropyl alcohol and the solution treated with an excess of dry hydrogen chloride and chilled. The insoluble product is collected on a filter. It is the dihydrochloride salt; M.P. 180–182° C. after crystallization from isopropyl alcohol. A citrate salt is obtained by reacting the free base with citric acid in isopropyl alcohol.

EXAMPLE 2

A solution of 1-(tert-butylamino)-3-(1-isoquinolyl) - 2-propanone dihydrochloride is prepared as follows. With stirring at 5° C., 240 ml. of a 1.67 M solution of butyllithium in heptane is added to a solution of 28.6 g. of 1-methyl-isoquinoline in one liter of dry ether. The solution is allowed to stand at room temperature for 15 minutes, cooled to 0° C., treated with 23 g. of (tert-butylamino) acetonitrile, stirred for 20 hours at room temperature, and then cooled to 0–5° C. An excess of dry hydrogen chloride is added and the insoluble 1-[2-amino-3-(tert-butylamino) propenyl]isoquinoline dihydrochloride is removed by filtration and dissolved in one liter of ethanol. The solution is stirred at room temperature for 30 minutes, and now contains 1-(tert-butylamino)-3-(1 - isoquinolyl) - 2 - propanone dihydrochloride. It is treated at 20° C. by the slow addition of 40 g. of sodium borohydride, stirred for 16 hours at room temperature, diluted with 250 ml. of water, heated to reflux, and filtered. The filtrate is evaporated under reduced pressure and the residue extracted with ether. The ether extract is washed with water, dried, and evaporated to give α-[(tert-butylamino)methyl]-1-isoquinolineethanol as an oil.

A solution of 21.5 g. of the above free base in 200 ml. of acetonitrile is added to a solution of 50 g. of picric acid in 250 ml. of acetonitrile. The insoluble dipicrate salt is collected on a filter; M.P. 205–208° C. after crystallization from acetonitrile (product obtained as a solvate with acetonitrile). A suspension of 4.8 g. of the dipicrate salt in 50 ml. of ether and 50 ml. of water is made basic with concentrated aqueous sodium hydroxide. The organic phase is separated, washed with water, dried and treated with an excess of dry hydrogen chloride. The insoluble dihydrochloride salt is collected on a filter; M.P. 190–195° C. following crystallization from isopropyl alcohol.

EXAMPLE 3

A mixture of 43.6 g. of α-[(benzyl-tert-butylamino)methyl]-4-methyl-2-quinolineethanol, 400 ml. of methanol, 20.5 ml. of concentrated hydrochloric acid, and 2.0 g. of 20% palladium on charcoal catalyst is shaken at room temperature with hydrogen at 50 pounds per square inch pressure until one molecular equivalent of hydrogen has been absorbed. The catalyst is removed by filtration and the filtrate evaporated under reduced pressure. The residue is dissolved in water and the solution made basic with potassium carbonate an extracted with ether. The ether extract is washed with water, dried, and evaporated to give a residue of α - [(tert - butylamino)methyl]-4-methyl-2-quinolineethanol; M.P. 62–64° C. after crystallization from hexane.

By reaction with one molecular equivalent of hydrogen, according to the foregoing general procedure, the following additional products are obtained using the indicated quantities of materials. In those cases where the starting material is originally present as free base, the product is isolated by filtering from the catalyst, evaporating the filtrate, extracting the residue with ether, washing the ether solution with water, drying, and evaporating.

From 23.5 g. of α-[(benzyl-tert-butylamino)methyl]-6-methyl-2-quinolineethanol dihydrochloride (analyzing for a solvate with one formula weight acetonitrile of crystallization), 200 ml. of methanol, and 1.0 g. of 20% palladium on charcoal catalyst, the product is α-[(tert-butylamino)methyl] - 6 - methyl-2-quinolineethanol; M.P. 71–72° C. after crystallization from hexane.

From 20.3 g. of α-[(benzyl-tert-butylamino)methyl]-7-methyl-2-quinolineethanol, 200 ml. of methanol, 9.5 ml. of concentrated hydrochloric acid, and 1.0 g. of 20% palladium on charcoal catalyst, the product is α-[tert-butylamino)methyl - 7 - methyl-2-quinolineethanol; M.P. 81–82.5° C. after crystallization from isopropyl ether-hexane. The dihydrochloride salt is obtained by adding a slight excess of dry hydrogen chloride to a solution of the free base in ether. It has M.P. 117–118° C. after crystallization from methanol-ether (product obtained as a hydrate).

From 20.2 g. of α-[(benzyl-tert-butylamino)methyl]-4-phenyl-2-quinolineethanol, 200 ml. of methanol, and 2.0 g. of 20% palladium on charcoal catalyst, the product is α-[(tert-butylamino)methyl]-4-phenyl - 2 - quinolineethanol; M.P. 63–64.5° C. after crystallizations from isopropyl ether-hexane (product obtained as a hydrate).

From 3.8 g. of α-[[benzyl-(3,4-dimethoxyphenethyl) amino]methyl]-3,4-dimethyl-2-quinolineethanol, 100 ml. of methanol, and 0.5 g. of 20% palladium on charcoal catalyst, the product is α-[[(3,4-dimethoxyphenethyl) amino]methyl]-3,4-dimethyl - 2 - quinolineethanol; M.P. 95–96.5° C. after crystallization from isopropyl alcohol-isopropyl ether.

From 34.7 g. of α-[(benzyl-tert-butylamino)methyl]-3,4-dimethyl-2-quinlineethanol, 200 ml. of tetrahydrofuran, 10 ml. of methanol, and 2.0 g. of 20% palladium on charcoal catalyst, the product is α[(tert-butylamino)methyl]-3,4-dimethyl-2-quinolineethanol; M.P. 93–94° C. after crystallizations from hexane and from isopropyl alcohol.

From 38.5 g. of α-[(benzylisopropylamino)methyl]-6-phenanthridineethanol, 250 ml. of tetrahydrofuran, 125 ml. of methanol, and 2.0 g. of 20% palladium on charcoal catalyst, the product is α-[(isopropylamino)methyl]-6-phenanthridineethanol. The dihydrochloride salt is prepared by treating a solution of the free base in tetrahydrofuran-methanol with dry hydrogen chloride. It has M.P. 120–125° C. after crystallizations from chloroform and from isopropyl alcohol.

From 61.2 g. of α-[(benzyl-tert-butylamino)methyl]-6-phenanthridineethanol, 600 ml. of methanol, 26.2 ml. of concentrated hydrochloric acid, and 2.0 g. of 20% palladium on charcoal catalyst, the product is α-[tert-butylamino)methyl]-6-phenanthridineethanol. A solution of the free base in ether is treated with an excess of dry hydrogen chloride and the insoluble product is collected on a filter. It is the dihydrochloride salt; M.P. 167–169° C. after crystallization from acetonitrile (product obtained as a solvate with one formula weight acetonitrile). A solution of 5.0 g. of the dihydrochloride salt, as obtained above, in water is made basic with potassium carbonate and extracted with ether. The ether extract is washed with water and added to a solution of 2.0 g. of oxalic acid in 10 ml. of ethanol. The insoluble product is collected on a filter, washed with ether, and dried. It is the salt with one formula weight oxalic acid; M.P. 180–183° C. following crystallization from ethanol.

EXAMPLE 4

A solution of α-[[benzyl-(3,4-dimethoxyphenethyl)amino]methyl]-6-phenanthridineethanol is prepared as follows. With stirring at 0–5° C., 60 ml. of a 1.67 M solution of butyllithium in heptane is added to a solution of 19.3 g. of 6-methylphenanthridine in 500 ml. of dry ether and the mixture is allowed to stand at room temperature for one hour. It is then treated with 31.5 g. of [benzyl-(3,4-dimethoxyphenethyl)amino]acetonitrile and allowed to stand 16 hours. The reaction mixture is washed with ice water, dried, and evaporated. The residue of 6-[2-amino-2,3-[benzyl-(3,4-dimethoxyphenethyl)amino]propenyl]phenanthridine is dissolved in 1500 ml. of dry ether and an excess of dry hydrogen chloride is added. The dihydrochloride salt which separates is collected on a filter and dried; M.P. 100–120° C. This salt is dissolved in 1500 ml. of ethanol and 100 ml. of water to give a solution containing 1-[benzyl-(3,4-dimethoxyphenethyl)amino]-3-(6-phenanthridinyl)-2-propanone. This solution is treated with 30 g. of sodium borohydride, allowed to stand at room temperature for 16 hours, and then evaporated under reduced pressure. The residue is extracted with ether and the ether extract is washed with water, dried, and evaporated to give α-[[benzyl-(3,4-dimethoxyphenethyl)amino]methyl]-6-phenanthridineethanol as a gum. A mixture of this product, 500 ml. of methanol, and 1.0 g. of 20% palladium on charcoal catalyst is shaken at room temperature with hydrogen at 50 pounds per square inch pressure until one molecular equivalent of hydrogen has been absorbed. The catalyst is removed by filtration and the filtrate evaporated under reduced pressure to give α-[[(3,4-dimethoxyphenethyl)amino]methyl]-6-phenanthridineethanol. A salt with one formula weight oxalic acid is obtained by adding 4.16 g. of the above free base to a solution of 1.5 g. of oxalic acid in 10 ml. of ethanol. The insoluble salt is collected on a filter; M.P. 145–150° C. after crystallization from 95% ethanol (product obtained as a hydrate).

EXAMPLE 5

A mixture of 39.6 g. of 1-(benzyl-tert-butylamino)-3-(6-phenanthridinyl)-2-propanone, 350 ml. of methanol, 16.6 ml. of concentrated hydrochloric acid, and 1.0 g. of 20% palladium on charcoal catalyst is shaken at room temperature with hydrogen at 50 pounds per square inch pressure until one molecular equivalent of hydrogen has been absorbed. The catalyst is removed by filtration and the filtrate is evaporated under reduced pressure. The residue is dissolved in water and the solution made basic with aqueous potassium carbonate and extracted with ether. The ether extract is washed with water, dried, and evaporated to give a residue of 1-(tert-butylamino)-3-(6-phenanthridinyl)-2-propanone. A solution of this free base in 50 ml. of ethanol is added to a solution of 12.6 g. of oxalic acid in 25 ml. of ethanol and the insoluble product collected on a filter. It is the salt with one formula weight oxalic acid; M.P. 225–230° C. after crystallization from ethanol. The dihydrochloride salt is obtained by reacting the free base in ether with an excess of hydrogen chloride.

Similarly, the following additional products are produced by hydrogenation of the N-benzyl derivatives.

1-(isopropylamino)-3-(6-phenanthridinyl)-2-propanone.
1-[(3,4-dimethoxyphenethyl)amino]-3-(6-phenanthridinyl)-2-propanone.

EXAMPLE 6

A solution of 6-[2-amino-3-(tert-butylamino)propenyl]phenanthridine is prepared as follows. With stirring, 240 ml. of a 1.67 M solution of butyllithium in heptane is added to a solution of 38.6 g. of 6-methylphenanthridine in one liter of dry ether. The mixture is stirred for one hour at room temperature, treated with 25 g. of (tert-butylamino)-acetonitrile, stirred for 16 hours at room temperature, and diluted with 300 ml. of ice water. The organic phase is separated, dried, and evaporated and the residue of crude 6-[2-amino-3-(tert-butylamino)propenyl]phenanthridine is dissolved in 60 ml. of concentrated hydrochloric acid and 60 ml. of water. This solution is heated at 60–70° C. for 5 minutes, cooled and made basic with potassium carbonate. The mixture is extracted with ether and the ether extract is washed with water, dried, and evaporated to give a residue of 1-(tert-butylamino)-3-(6-phenanthridinyl)-2-propanone. A solution of this free base in 50 ml. of ethanol is added to a solution of 12.6 g. of oxalic acid in 25 ml. of ethanol and the insoluble product collected on a filter. It is the salt with one formula weight oxalic acid; M.P. 225–230° C. after crystallization from ethanol. The dihydrochloride salt is obtained by reacting the free base in ether with an excess of hydrogen chloride.

Similarly, the following additional products are produced by acidic hydrolysis of the corresponding eneamines. The eneamines are prepared by forming the lithium derivative of 6-methylphenanthridine with butyllithium and reacting it with a substituted aminoacetonitrile followed by hydrolysis of the reaction mixture with water.

1-(isopropylamino)-3-(6-phenanthridinyl)-2-propanone.
1-[(3,4-dimethoxyphenethyl)amino]-3-(6-phenanthridinyl)-2-propanone.

STARTING MATERIALS

At 0–5° C., 300 ml. of a 1.67 M solution of butyllithium in heptane is added to a solution of 36 g. of quinaldine (2-methylquinoline) in 300 ml. of dry ether. The solution is allowed to stand at room temperature for one hour, cooled to 0–5° C., and treated with 28 g. of (tert-butylamino)acetonitrile. The reaction mixture is allowed to stand 16 hours at room temperature, cooled to 0–5° C., and treated with 400 ml. of ice water. The organic phase is separated, washed with water, dried, and evaporated under reduced pressure to give an oily residue of 2-[2-amino-3-(tert - butylamino)propenyl]

quinoline. This product is hydrolyzed by extracting it with 100 ml. of concentrated hydrochloric acid. The acidic extract is filtered and the filtrate is evaporated under reduced pressure to give a residue of 1-(tert-butylamino)-3-(2-quinolyl) - 2-propanone dihydrochloride; M.P. 135–140° C. after crystallization from isopropyl alcohol.

A mixture of 174 ml. of 70% glycolonitrile (hydroxyacetonitrile) in water and 326 g. of benzyl-tert-butylamine is heated at 90–95° C. for 5 minutes, cooled, and diluted with 500 ml. of benzene. The mixture is washed with water and the benzene phase is dried and evaporated under reduced pressure to give (benzyl-tert-butylamino)acetonitrile; B.P. 85° C. at 0.1 mm. Similarly, from 25 g. of 70% glycolonitrile and 75.5 g. of N-benzyl-3,4-dimethoxyphenethylamine, the product is [benzyl-(3,4-dimethoxyphenethyl)amino]acetonitrile; B.P. 175° C. at 0.2 mm. Similarly, from 87 ml. of 70% glycolonitrile and 149 g. of benzylisopropylamine, the product is (benzylisopropylamino)acetonitrile; B.P. 80° C. at 0.1 mm.

A solution of 29.1 g. of 2,4-dimethylquinoline in one liter of dry ether is treated at 0–5° C. with 120 ml. of a 1.67 M solution of butyllithium in heptane. The solution is allowed to stand at room temperature for one hour and then 38 g. of (benzyl-tert-butylamino)acetonitrile is added. The reaction mixture is allowed to stand for 16 hours, washed with water, and the organic phase is dried and evaporated to give 2-[2-amino-3-(benzyl-tert-butylamino)propenyl] - 4 - methylquinoline; M.P. 114–115° C. after crystallization from isopropyl alcohol. The following additional products are obtained similarly. From 2,6-dimethylquinoline and (benzyl-tert-butylamino)acetonitrile, the product is 2-[2-amino-3-(benzyl-tert-butylamino)propenyl]-6-methylquinoline; M.P. 117–118° C. after crystallization from isopropyl alcohol. From 2,7-dimethylquinoline and (benzyl-tert-butylamino)acetonitrile, the product is 2-[2-amino-3-(benzyl-tert-butylamino)propenyl]-7-methylquinoline; M.P. 95.5–97° C. after crystallization from isopropyl alcohol. From 4-phenylquinaldine and (benzyl-tert-butylamino)acetonitrile, the product is 2-[2-amino - 3-(benzyl-tert-butylamino)propenyl]-4-phenylquinoline; M.P. 77–81° C. after crystallization from methanol-acetone. From 2,3,4-trimethylquinoline and [benzyl-(3,4-dimethoxyphenethyl)amino] acetonitrile, the product is 2-[2-amino-3-[benzyl-(3,4-dimethoxyphenyl)amino]propenyl] - 3,4 - dimethylquinoline; the dihydrochloride is obtained by dissolving the free base in ether and adding an excess of dry hydrogen chloride. From 2,3,4-trimethylquinoline and (benzyl-tert-butylamino)acetonitrile, the product is 2-[2-amino-3-(benzyl-tert-butylamino)propenyl] - 3,4 - dimethylquinoline; M.P. 133–134° C. after crystallization from isopropyl alcohol-acetone. From 6-methylphenanthridine and benzylisopropylamino)acetonitrile, the product is 6-[2-amino-3 - (benzylisopropylamino)propenyl]phenanthridine; M.P. 132–133° C. after crystallization from isopropyl alcohol. From 6-methylphenanthridine and (benzyl-tert-butylamino)acetonitrile, the product is 6-[2-amino-3-(benzyl-tert-butylamino)propenyl]phenanthridine; M.P. 135–136° C. after crystallization from isopropyl alcohol.

A solution of 49.5 g. of 2-[2-amino-3-(benzyl-tert-butylamino)propenyl]-4-methylquinoline in 50 ml. of concentrated hydrochloric acid and 50 ml. of water is heated to 60–70° C., cooled, made basic with potassium carbonate, and extracted with ether. The ether extract is washed with water, dried, and evaporated to give a residue of 1 - (benzyl - tert-butylamino)-3-(4-methyl-2-quinolyl)-2-propanone; M.P. 126–127° C. after crystallization from isopropyl alcohol. The following additional products are obtained similarly. From 2-[2-amino-3-(benzyl-tert-butylamino)propenyl] - 6 - methylquinoline, the product is 1-(benzyl-tert-butylamino)-3-(6-methyl - 2 - quinolyl) - 2-propanone; M.P. 111–112° C. after crystallization from isopropyl alcohol. From 2-[2-amino-3-(benzyl-tert-butylamino)propenyl] - 7 - methylquinoline, the product is 1-(benzyl-tert-butylamino)-3-(7-methyl - 2 - quinolyl) - 2-propanone; M.P. 108.5–110° C. after crystallization from isopropyl alcohol. From 2-[2-amino-3-(benzyl-tert-butylamino)propenyl] - 4 - phenylquinoline, the product is 1-(benzyl-tert-butylamino) - 3 - (4 - phenyl-2-quinolyl)-2-propanone; M.P. 104.5–105.5° C. after crystallizations from isopropyl alcohol. From 2-[2-amino-3-(benzyl-tert-butylamino)propenyl]-3,4-dimethylquinoline, the product is 1-(benzyl-tert-butylamino)-3-(3,4-dimethyl-2-quinolyl)-2-propanone; M.P. 130–131° C. after crystallizations from isopropyl alcohol. From 6-[2-amino-3-(benzylisopropylamino)propenyl]phenanthridine, the product is 1-(benzylisopropylamino)-3-(6 - phenanthridinyl) - 2 - propanone; M.P. 92–95° C. after crystallization from isopropyl alcohol. From 6 - [2 - amino-3-(benzyl-tert-butylamino)propenyl]phenanthridine, the product is 1-(benzyl-tert-butylamino)-3-(6-phenanthridinyl)-2-propanone; M.P. 151–152° C. after crystallization from isopropyl alcohol. The hydrolysis procedure can be varied if desired; for example, a solution of 55 g. of 2-[2-amino-3-[benzyl-(3,4-dimethoxyphenethyl)amino]propenyl] - 3,4 - dimethylquinoline dihydrochloride in 1500 ml. of ethanol and 100 ml. of water is heated to the reflux temperature, cooled, diluted with water, made basic with potassium carbonate, and extracted with ether. The ether extract is washed with water, dried, and evaporated to give a residue of 1-[benzyl-(3,4-dimethoxyphenethyl)amino] - (3,4-dimethyl-2-quinolyl)-2-propanone.

With stirring at room temperature, 20 g. of sodium borohydride is slowly added to a solution of 50 g. of 1-(benzyl-tert-butylamino)-3-(4-methyl-2-quinolyl) - 2 - propanone in 700 ml. of ethanol and 300 ml. of tetrahydrofuran. The solution is stirred for 20 hours, heated to reflux, diluted with 250 ml. of water, and evaporated under reduced pressure. The residue is extracted with ether and the ether extract is washed with water, dried, and evaporated to give α-[(benzyl-tert-butylamino)methyl]-4-methyl - 2 - quinolineethanol; M.P. 95–96° C. after crystallization from isopropyl ether. In a similar manner the following additional products are obtained using the indicated quantities of materials.

From 56.3 g. of 1-(benzyl-tert-butylamino)-3-(6-methyl-2-quinolyl)-2-propanone, 2.5 liters of ethanol, 750 ml. of tetrahydrofuran, and 20 g. of sodium borohydride, the product is α-(benzyl-tert-butylamino)methyl]-6-methyl-2-quinolineethanol. The free base is dissolved in hexane and a slight excess of dry hydrogen chloride is added with cooling. The insoluble dihydrochloride salt is collected on a filter and recrystallized from acetonitrile; M.P. 190–195° C. (product obtained as a solvate with one formula weight acetonitrile).

From 44.5 g. of 1-(benzyl-tert-butylamino) - 3 - (7-methyl-2-quinolyl)-2-propanone, 2.6 liters of ethanol, 200 ml. of tetrahydrofuran, and 14 g. of sodium borohydride, the product is α - [(benzyl - tert-butylamino)methyl]-7-methyl-2-quinoline-ethanol; M.P. 82–83° C. after crystallization from isopropyl alcohol.

From 47 g. of 1-(benzyl-tert-butylamino)-3-(4-phenyl-2-quinolyl)-2-propanone, 1.0 liter of ethanol, 1.0 liter of tetrahydrofuran, and 13 g. of sodium borohydride, the product is α-[(benzyl-tert-butylamino)methyl]-4-phenyl-2-quinolineethanol; M.P. 92–92.5° C. after crystallizations from isopropyl alcohol-hexane.

From 50 g. of 1 -[benzyl - (3,4 - dimethoxyphenethyl) amino] - 3 - (3,4 - dimethyl - 2 - quinolyl)-2-propanone, 700 ml. of ethanol, 300 ml. of tetrahydrofuran, and 30 g. of sodium borohydride, the product is α - [[benzyl - (3,4-dimethoxyphenethyl)amino]methyl] - 3,4 - dimethyl - 2-quinoline-ethanol.

From 41.6 g. of 1 -(benzyl - tert - butylamino)-3-(3,4-dimethyl - 2 - quinolyl) - 2 - propanone, 2.6 liters of ethanol, 500 ml. of tetrahydrofuran, and 15.4 g. of sodium borohydride, the product is α - [(benzyl - tert - butylamino)methyl] - 3,4 - dimethyl - 2 - quinolineethanol;

M.P. 115–116° C. after crystallization from isopropyl alcohol.

From 59 g. of 1 - (benzylisopropylamino) - 3 - (6-phenanthridinyl) - 2 - propanone, 2.0 liters of ethanol, 500 ml. of tetrahydrofuran, and 27 g. of sodium borohydride, the product is α - [(benzylisopropylamino)methyl] - 6-phenanthridineethanol; M.P. 128–129° C. after crystallization from ethanol.

From 72 g. of 1 - (benzyl - tert - butylamino)-3-(6-phenanthridinyl) - 2 - propanone, 2.0 liters of ethanol, 1.0 liter of tetrahydrofuran, and 25 g. of sodium borohydride, the product is α - [(benzyl - tert - butylamino)methyl] - 6 - phenanthridineethanol; M.P. 132–134° C. atfer crystallization from ethanol.

What is claimed is:

1. A member of the class consisting of compounds of the formula

Ar—CH<sub>2</sub>—A—CH<sub>2</sub>—NH—R and non-toxic acid-addition salts thereof; where Ar is a member of the class consisting of 2-quinolyl, 2-quinolyl substituted by a single methyl group, 3,4 - dimethyl - 2-quinolyl, 4 - phenyl - 2 - quinolyl, 1 - isoquinolyl, and 6-phenanthridinyl; A is a member of the class consisting of hydroxymethylene and carbonyl; and R is a member of the class consisting of isopropyl, tert - butyl, and 3,4-dimethoxyphenethyl; provided that when A is carbonyl, Ar is 6-phenanthridinyl.

2. A compound according to claim 1 wherein Ar is 6-phenanthridinyl.

3. The compound according to claim 2 which is α-[(isopropylamino)methyl]-6-phenanthridineethanol.

4. The compound according to claim 2 which is α-[(tert - butylamino) methyl] - 6 - phenanthridineethanol.

5. The compound according to claim 2 which is α-[[(3,4 - dimethoxyphenethyl)amino]methyl] - 6 - phenanthridineethanol.

6. A compound according to claim 2 which is 1-(tert-butylamino) - 3 - (6 - phenanthridinyl) - 2 - propanone.

7. A compound according to claim 2 in the form of an acid-addition salt.

References Cited
UNITED STATES PATENTS

| | | | |
|---|---|---|---|
| 3,654,281 | 4/1972 | Montzka et al. | 260—288 R |
| 2,948,722 | 8/1960 | Biel | 260—288 R |
| 3,143,550 | 8/1964 | Evans et al. | 260—288 R |
| 3,639,476 | 2/1972 | Eberle et al. | 260—288 R |

DONALD G. DAUS, Primary Examiner

M. VAUGHN, Assistant Examiner

U.S. Cl. X.R.

260—283 R, 286 R, 288 R, 465 E; 424—258